United States Patent Office 2,988,175
Patented June 13, 1961

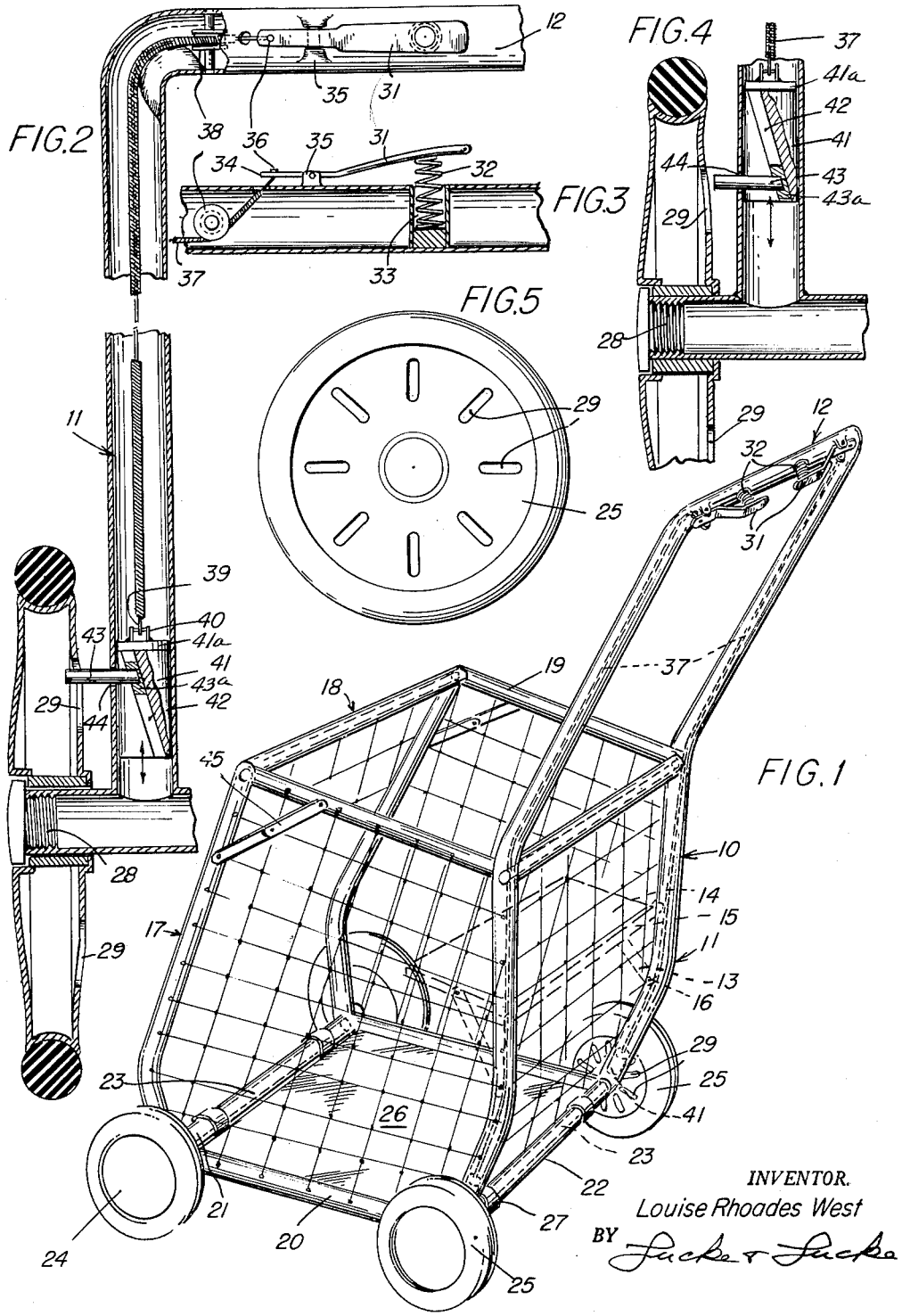

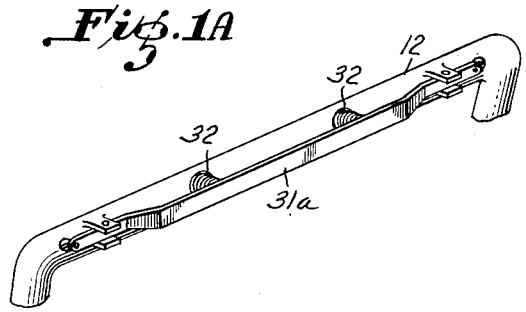
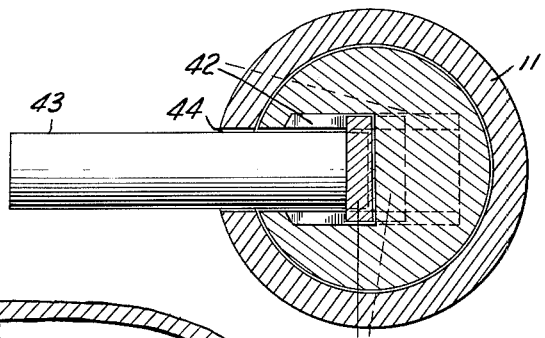
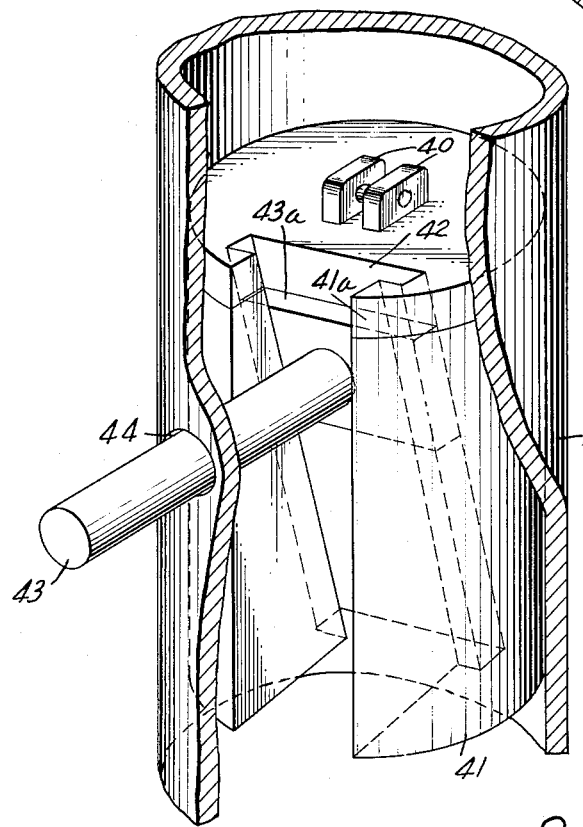

2,988,175
AUTOMATIC BRAKE FOR A WHEELED VEHICLE
Louise Rhoades West, 1701 Coralway, Belmar, N.J.
Filed Sept. 6, 1955, Ser. No. 532,424
5 Claims. (Cl. 188—31)

This invention relates to manually propelled vehicles and in particular to a safety lock for braking such vehicles. This invention is especially useful in its application to children's carriages or strollers, to which use however, it is not restricted.

Many types of conveyances have been devised for children of all ages. When a child grows too large for a carriage, it is customary to obtain a stroller of one type or another. There is the combination stroller-walker and convertible parcel carrier-stroller, but whether the strong, rigid type of stroller or the lighter, folding type, all of the stollers presently available are adapted to primarily accommodate the young child in sitting positions only.

After a child reaches the toddler stage from the ages of one and one-half to three years, it is difficult to keep him seated for long periods of time. He wishes to walk or at least to be on his feet in standing position. This is a very difficult period for the parent or guardian who must control the youngster's unpredictable movements when in public to keep him out of danger. A child soon becomes rebellious at holding one's hand and although reins keep him from wandering away, they do not solve the problem of either constantly tugging or dragging the child in the desired direction or of carrying it.

I have now invented a vehicle adapted to convey a child, or children in standing position. This vehicle or standing stroller is provided with a floor; a folding seat; a hand support for the child when in either standing or sitting position and an enclosure between the floor and hand rail to retain the child within the stroller until lifted out.

A vehicle of this type allows for greater freedom of action within the stroller, but also a greater reach by its occupant, thereby requiring an improved type of braking system. I have therefore incorporated in my stroller an automatic brake which is released by positive pressure applied to the handle only when pushing the vehicle. When pressure is released from the brake operating bar, the vehicle is automatically stopped in less than a quarter turn of the wheels as will be hereinafter described.

It is possible that the child may wish upon occasion to sit on the floor instead of on the seat. The confining material may therefore be wholly or partly transparent. It may also be windproof or ventilated to accommodate various seasons. In like manner the stroller may be equipped with an awning to protect against sun or shower.

Further objects and features of the invention will become apparent from the following detailed description of the preferred embodiments illustrated by way of example in the accompanying drawing in which:

FIG. 1 is a perspective view of a preferred embodiment of a standing stroller;

FIG. 1A is a modified form of the brake operating bar;

FIG. 2 is a broken sectional view of the handle, a rear wheel and connecting tubular frame showing the braking mechanism in locked position;

FIG. 3 is a broken sectional bottom plan view of a brake operating bar;

FIG. 4 is a broken elevational view in section of a rear wheel in operative position;

FIG. 5 is an inner side elevation of a slotted rear wheel;

FIG. 6 is a cross-sectional view of the cam, pin and retaining block; and

FIG. 7 is a detail perspective view of the cylinder, flanged groove, pin and retaining block shown in FIG. 6.

Referring to the drawing:

The stroller illustrated in FIG. 1 is advantageously constructed of a tubular metal frame chassis 10 such as aluminum or stainless steel. As will be seen, such tubular construction affords desirable lightness in weight and streamlined appearance by providing the housing for front and rear axles and the braking mechanism.

The rear section 11 of tubular frame 10 extends upwardly to form handle 12. The lower portion of section 11 is bent rearwardly to position braces 13 which lock to support folding seat 14 pivotally mounted on the tubular uprights of section 11 as by rod 15. Braces 13 may be mounted on rear section 11 and seat 14 in any acceptable manner as by bolts 16.

The lower portion of front section 17 may be correspondingly bent forwardly to provide additional leg room for a child or storage space for carrying packages. The upper portion of front section 17 forms a hand rail 18 to support a child in standing or sitting position.

Front and rear sections of frame 10 are pivotally connected to upper and lower tubular cross bars 19 and 20 which allow the forward section of the stroller to be raised upwardly to substantially folded position, closely parallel to rear section 11. This affords an easy means of carrying the stroller and facilitates transporting it by car, bus or train as well as reducing storage space when not in use. A handle (not shown) may be provided for carrying the vehicle in the manner of a suitcase when folded.

Tubular cross bars 21 and 22 complete front and rear sections 17 and 11 respectively and house axles 23, 23 to which front and rear wheels 24 and 25 are attached. A platform or floor 26 is also pivotally supported by clips 27 around tubular cross bars 21 and 22. The floor is arranged to be raised into parallel position when the stroller is folded.

Front wheels 24 are swiveled in the usual way (not shown) in order to steer the vehicle. Fixed rear wheels 25, 25 shown attached to axle 22 as by threaded end 28, are of a special construction. Slots 29 are radially disposed around the inner side of wheels 25 and are constructed and arranged to readily engage pins 43, as will hereinafter be described.

FIGS. 2, 3 and 4 show a preferred embodiment of the automatic braking mechanism comprising two manually operated bars 31, one for each of rear wheels 25, mounted upon the handle 12. One end of the operating bar 31 is secured to a compression spring 32, fixedly housed in a recess 33 of the handle 12. The other end 34 of operating bar 31 is pivotally mounted through raised bracket 35 disposed on the rear of handle 12, and attached, as by hook 36, to one end of flexible cables 37. Flexible cables 37 are centrally positioned around a pulley 38 mounted interiorly of tubular handle 12 and attached as by a hook 39 or like means to an extension 40 of a movable cam 41. The cam is shown of cylindrical construction mounted for limited non-rotational movement within housing 11. A diagonal flanged groove 42 extends from the bottom rear to the top front of the cam as seen from FIGS. 2 and 4. A pin 43, secured to the cam as by retaining block 43a over which flanged groove 42 rides, is arranged to extend outwardly through an aperture 44 in said tubular frame 11 adjacent wheels 25. The forward limit position and the rearward limit position of the pin through the aperture being determined by the upper and lower position of block 43a in groove 42. The upper and lower limit position of the cam in housing 11 is limited by pin 43, restrained against vertical movement relative to the housing by aperture 44.

The radial slots 29 of wheels 25 are constructed and arranged to engage pins 43 when operating bar 31 is released thereby allowing cam 41 to fall to its lower limit position to hold the vehicle securely locked, as shown in FIG. 2. The vehicle is advantageously braced by hinged supports 45 to ensure the rigidity of the frame when erected for use. To assure immediate gravitational response of the cam and automatic locking of the wheels when pressure on operating bar 31 is released, the cam must be made of metal or other strong, heavy material.

Cap 41a may be removed to assemble block 43a for sliding horizontal movement relative to diagonal groove 42. A section of housing 11 in which aperture 44 is disposed may be removed for assembly of the cam in operational association with flexible cable 37.

In operation, the standing stroller or like vehicle is automatically braked upon release of manual pressure on operating bars 31. Upon such pressure release spring 32 forces operating bars 31 rearwardly and outwardly away from handle 12 thereby lessening tension on flexible cable 37. This in turn allows cam 41 to fall in relation to aperture 44 forcing pin 43 outwardly through the action of diagonal groove 42 for positive engagement with the nearest radial slot 29 in wheels 25. In the embodiment illustrated, pins 43 will engage slots 29 at each 45° turn of the wheel, thus limiting accidental motion of the vehicle to one eighth turn of rear wheels 25.

Conversely, to transport the vehicle operating bars 31 are pressed forwardly toward handle 12 thereby tensioning flexible cables 37 and raising movable cam 41 to retract pin 43 from radial slot 29 thus freeing wheels 25 for motion, as shown in FIG. 4. It is understood that extension 40 may be fixed directly to a cam with a closed top and cap 41a disposed at the bottom of cam 41.

As stated, this invention prevents wheels 25 from turning more than 45° unless operating bars 31 are depressed by hand. With the exception of operating bars 31 and pins 43, the entire braking mechanism is completely and advantageously housed within tubular frame 11 thus providing protection against accidental displacement and weather.

Although a standing stroller having a substantially open material enclosing its four sides is illustrated in FIG. 1, such highly ventilated material may be replaced at will with a windproof or waterproof enclosure as by screws, snaps or like conventional means.

As stated previously, the stroller may also be provided with an awning (not shown) for protection against sun or inclement weather.

Although two manual operating bars 31 are shown in the drawing, it may be preferable to construct and arrange for but one operating bar 31a centrally disposed upon the handle 12 to simultaneously control the braking and release of both rear wheels 25. This adaptation of the invention would allow the vehicle to be pushed with one hand if necessary, and yet be tamper-proof by the occupant or occupants of the vehicle from accidental motion.

It is also to be understood that the braking system in general and the cam in particular have been described in relation to a left-handed rear wheel as illustrated in the drawing. The cam used to brake a right-handed rear wheel would of course be conversely mounted so that its groove pointed upwardly to the right with its pin in greater proximity to the slotted rear wheels at the point of its lower or braked position.

It will be seen from the above, that the invention provides a safe, easy means of transporting children during the stages when they will not sit or walk as desired, but are content to stand. It is further understood that the tubular frame may be widened to accommodate twins.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:
1. An automatic braking device for a manually propelled vehicle comprising an inverted U-shaped tubular housing, the ends of said housing secured to an axle of said vehicle, retention means disposed on a wheel of said vehicle proximate one end of said housing, an aperture in said housing disposed proximate said wheel, an elongated cylinder mounted for gravitational descent within an arm of said U-shaped housing, a flanged cam surface disposed diagonally from the top to the bottom of said cylinder, a pin, one end of said pin projecting transversely through said housing aperture for engagement with said retention means, a block secured to the opposite end of said pin retained within said flanged surface, the top of said surface being positioned adjacent said aperture when said pin engages said retention means, pressure means for raising said cam surface over said block to withdraw said pin out of engagement with said wheel retention means, whereby release of said cylinder from said raised position automatically lowers said cam surface over said block to thrust said pin into braking engagement with said wheel retention means.

2. An automatic braking device according to claim 1 wherein said flanged cam surface comprises a diagonally cut groove and a cap for said cylinder to retain said block in engagement with said surface.

3. An automatic braking device according to claim 1 wherein said housing forms the rear section of said vehicle.

4. An automatic braking device according to claim 3 wherein said pressure means comprises a cable for suspending said cylinder within said rear section, a lever for tensioning said cable when pressure is applied thereto to raise said cylinder, a resilient element for returning said lever to its normal position, said lever disposed on the handle of said vehicle being activated by pushing the handle of said vehicle.

5. An automatic brake according to claim 1 wherein said cylinder is non-rotationally mounted in said housing and restrained therein between said upper limit position and said lower limit position by said pin.

References Cited in the file of this patent

UNITED STATES PATENTS

| | | |
|---|---|---|
| 966,046 | Noonan | Aug. 2, 1910 |
| 1,521,627 | Jacobs | Jan. 6, 1925 |
| 1,709,527 | Ford | Apr. 16, 1929 |
| 1,916,222 | Jarmin | July 4, 1933 |
| 2,176,472 | Rogers et al. | Oct. 17, 1939 |
| 2,423,311 | Griffin | July 1, 1947 |
| 2,468,604 | Salat | Apr. 26, 1949 |
| 2,544,099 | Malin | Mar. 6, 1951 |
| 2,552,453 | Pintar | May 8, 1951 |
| 2,560,108 | Hieb | July 10, 1951 |
| 2,679,302 | Watson et al. | May 25, 1954 |
| 2,785,906 | Matter | Mar. 19, 1957 |

FOREIGN PATENTS

| | | |
|---|---|---|
| 397,436 | France | Feb. 24, 1909 |
| 658,197 | France | Jan. 22, 1929 |
| 571,953 | Great Britain | Sept. 17, 1945 |